Aug. 23, 1949.  J. Y. SCOTT ET AL  2,479,973
CHUCK
Filed Feb. 14, 1947  3 Sheets-Sheet 1
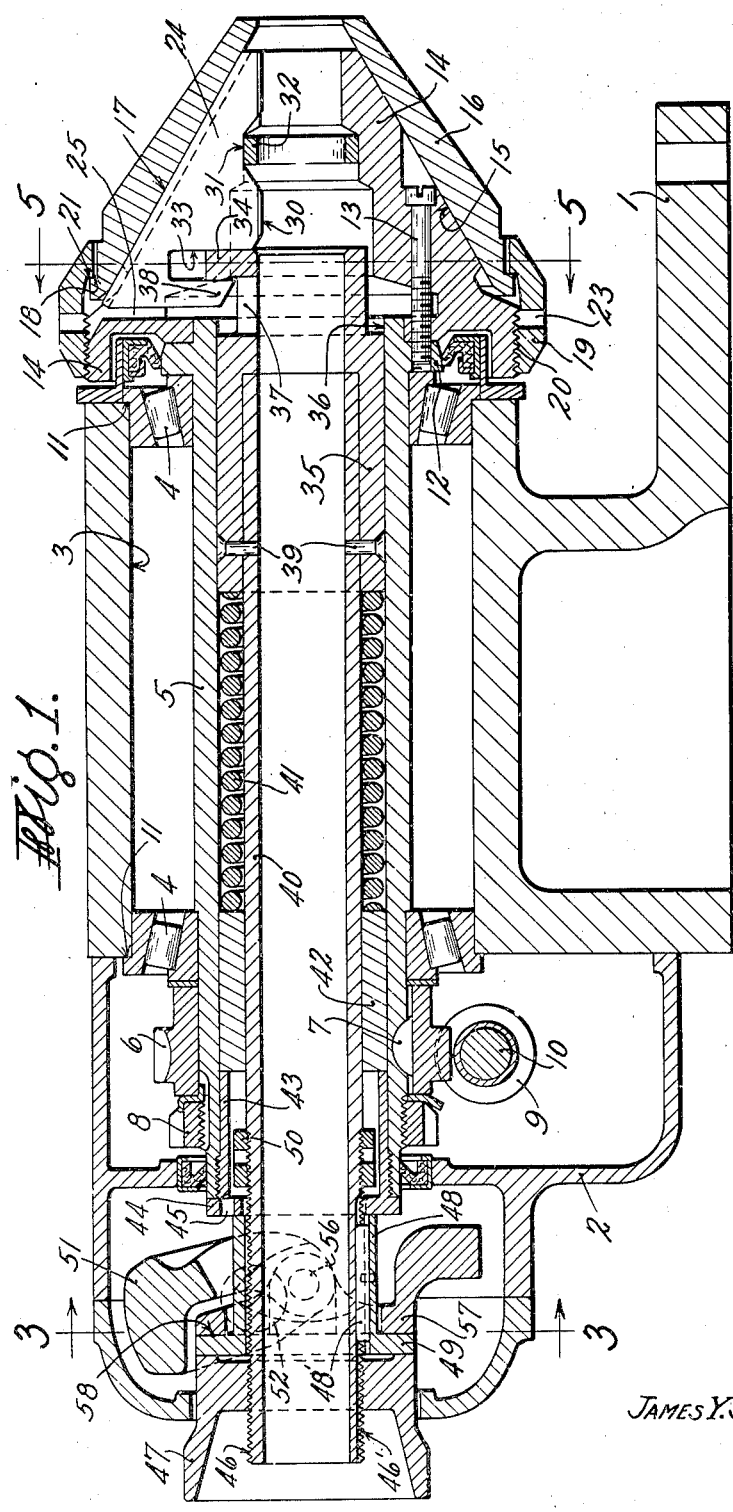
INVENTORS
JAMES Y. SCOTT, FRANCIS P. HEALY AND
BY EDWARD A. ALLEN
Chapin & Neal
ATTORNEYS Aug. 23, 1949.   J. Y. SCOTT ET AL   2,479,973
CHUCK
Filed Feb. 14, 1947   3 Sheets-Sheet 2

INVENTORS
JAMES Y. SCOTT, FRANCIS P. HEALY AND
BY EDWARD A. ALLEN
Chapin + Neal
ATTORNEYS Aug. 23, 1949.　　　J. Y. SCOTT ET AL　　　2,479,973
CHUCK
Filed Feb. 14, 1947　　　3 Sheets-Sheet 3
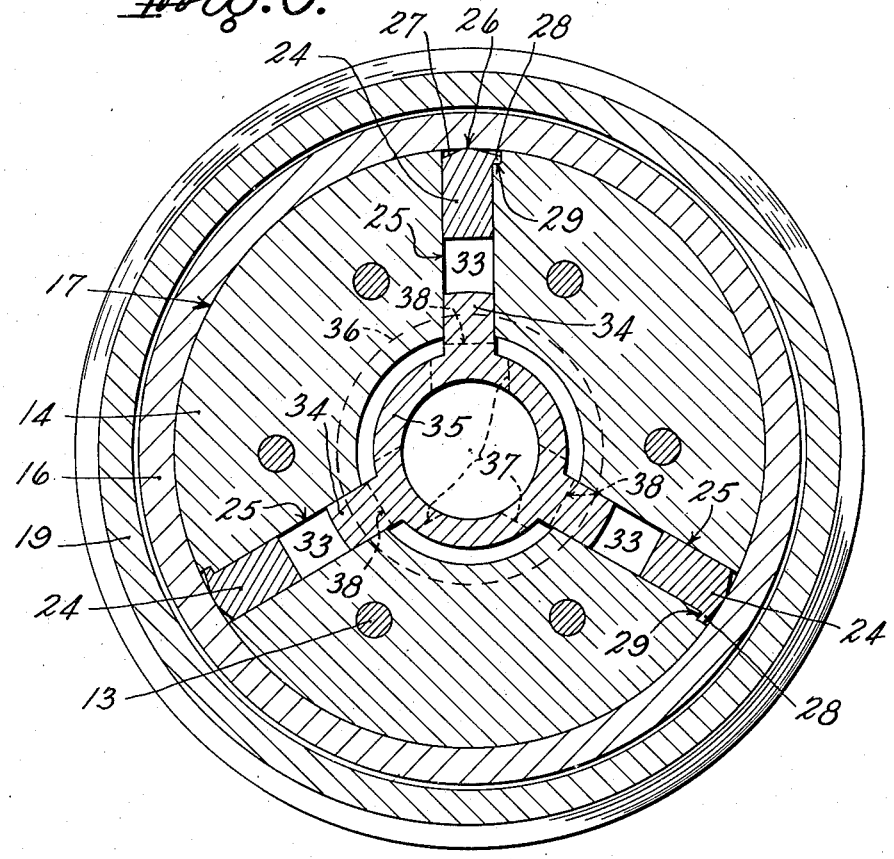
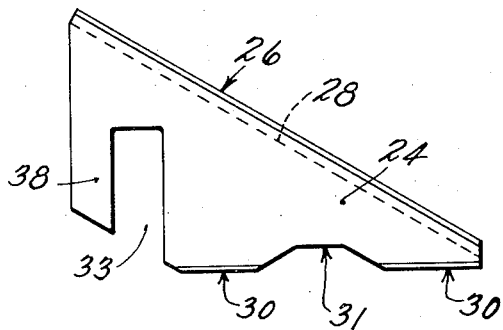
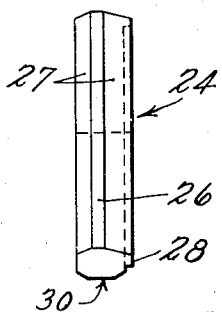
INVENTORS
JAMES Y. SCOTT, FRANCIS P. HEALY AND
BY EDWARD A. ALLEN
Chapin + Neal
ATTORNEYS Patented Aug. 23, 1949

2,479,973

UNITED STATES PATENT OFFICE 2,479,973

CHUCK

James Y. Scott, Longmeadow, Francis P. Healy, Springfield, and Edward A. Allen, Westfield, Mass., assignors to Van Norman Company, Springfield, Mass., a corporation of Massachusetts Application February 14, 1947, Serial No. 728,520

12 Claims. (Cl. 279—65)

This invention relates to improvements in chucks, particularly such as are intended for holding rods such as the stems of poppet valves while their conical faces are being ground.

One object of the invention is to provide a chuck which will have at the same time great accuracy in positioning a work piece coaxially with the axis of rotation of the chuck-carrying spindle, rapidity of operation, and a wide range of adjustment as to the size of work piece which can be held. A further object is to improve the accuracy with which the chuck can hold valve stems which have become worn in use. Additional objects will appear from the following description and claims.

The invention will now be described with reference to the accompanying drawings, in which Fig. 1 is a central vertical section through a spindle carrying the improved chuck;

Fig. 2 is a partial top plan, at reduced scale, showing the chuck operating handle;

Fig. 5 is a full scale section on line 5—5 of Fig. 1;

Fig. 6 is a full scale side elevation of one of the chuck jaws; and

Fig. 7 is an end view thereof.

Figure 3:
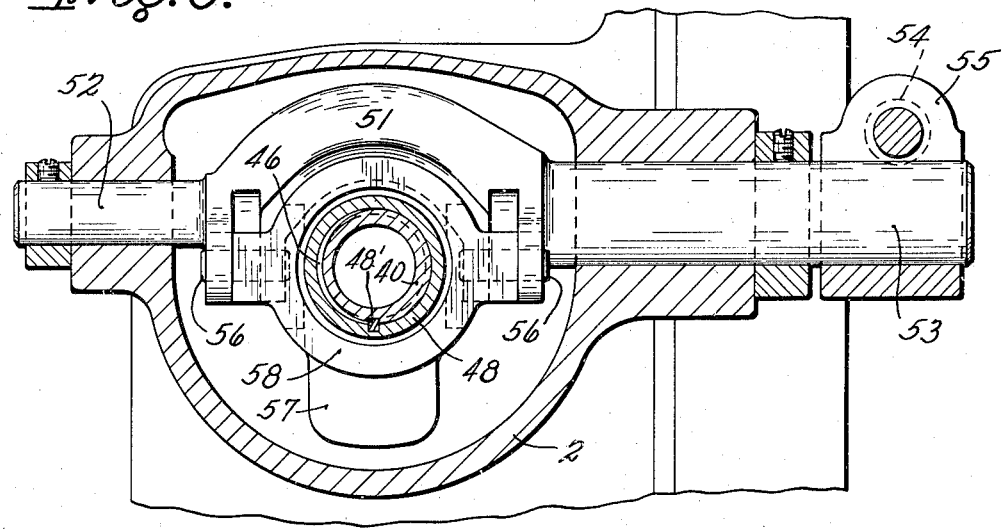
Fig. 3 is a section taken on line 3—3 of Fig. 1 which shows parts for operating the clutch jaws.
Figure 4:
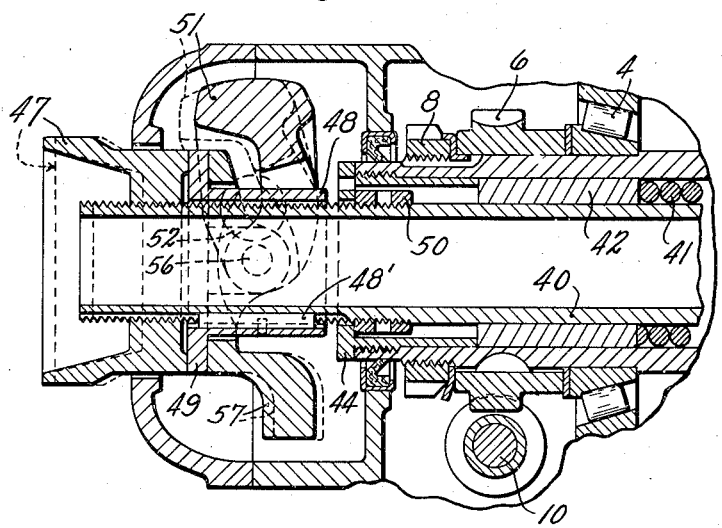
Fig. 4 is a central vertical section similar to Fig. 1, with parts broken away, to show the operation of the mechanism between the operating handle and the reciprocating jaw operating tube.

The chuck will be described as adapted to a work head for grasping poppet valves by their stems and rotating them during the regrinding of their valve faces. The work head is carried within a base 1 having a housing 2 made separate for convenience in manufacture and assembly. The base has a through bore 3 within which bearings 4 support a spindle 5. At one end of the spindle a worm gear 6 is held by a key 7 and a clamp nut 8, and meshes with a worm 9 on a shaft 10 which may be rotated in any desired way. Axial movement of the spindle is prevented as by shoulders 11 on the bearings 4 engaging with the ends of the bore 3.

Attached to a flange 12 on the other end of the spindle as by screws 13 is a chuck body 14 of generally frusto-conical inside and outside form, although shown as internally stepped for convenience in manufacture. The chuck body is made of hardened steel, as is the spindle flange, and the mating surfaces of the chuck body and flange are accurately ground so that the chuck body will rotate as a functionally integral part of the spindle. With the chuck body in place on the spindle its outer conical surface is ground so as to produce a conical bearing surface 15 upon which fits a chuck cone 16, the inner surface 17 of which is ground accurately to form a cone of the same angularity as the surface 15. The apex angle of the cones is preferably 60°. Externally the chuck cone is provided with a flange 18 which is ground square with the axis of the conical surface 17. When the chuck cone 16 is slipped over the chuck body 14 the surfaces 15 and 17 bear against each other and are held in contact by an attaching ring 19 threaded at 20 to the outside of the chuck body and having an inwardly projecting flange 21 ground true with the threads and engaging the shoulder 18 previously mentioned. The ring 19 may be tightened by external knurling or by spanner holes 23 so as to hold the chuck cone and the chuck body firmly together. The flanges 18 and 21 form the only contact between the chuck cone and the ring, so that there is no strain on the cone preventing it from mating accurately with the body.

The purpose of this construction is to provide an internal conical surface 17 which is perfectly concentric with the axis of the spindle. It is very difficult to grind an internal cone true with the rotating axis, but much easier to grind the external conical surface 15. With the latter surface ground true, the conical surface 17 is positioned accurately exactly concentric with the rotating axis so as to serve as a guide for chuck jaws 24 located in slots 25 in the chuck body. The jaws have narrow outer flat surfaces 26 (Figs. 5 and 7) in contact with the surface 17, are slabbed off adjacent this surface at 27, and have a single side lip 28 the lower surface of which is parallel to the flat 26 and runs against a corresponding shoulder 29 adjacent one of the slots 25. The inner bearing surfaces 30 of the chuck jaws are ground parallel to the axis of rotation. So that this may be done accurately the jaws are cut away to form recessed flats 31. If the jaws are, by mechanism to be described, pushed slightly towards the smaller end of the chuck cone with their external flats 26 in contact with the conical surface 17 and the recessed flats 31 in contact with a temporary circular ring 32, the internal diameter of which is greater than the inner bearing flats 30 of the chuck jaws, the latter may be ground collectively exactly concentric with the axis of rotation of the spindle. They will then preserve this relationship irrespective of their position of adjustment since both the guiding conical surface 17 and the bearing flats 30 are concentric with the axis. The diameter of the cylinder to which the jaws are collectively ground is preferably slightly larger than the largest work piece to be handled. If the ring is too large to be removed through the opening in the end of the chuck cone 16 the latter and one of the jaws 24 is removed and the ring taken out through the slot 25 thus left open.

In order to adjust the chuck jaws radially they are caused to slide axially with their outer surfaces in contact with the cone 17. For this purpose each jaw is provided with a radial notch 33 receiving one of three projections or lugs 34 on a spider 35 axially slidable in a bore 36 within the spindle 5. Behind each of the lugs is a hole 37 to receive the finger 38 forming the rear wall of the notch 33. The spider is kept from rotation relative to the cones and jaws by engagement of its projections 34 within the slots 25 of the chuck body. As the spider is moved forward within the spindle the outer conical surfaces of the jaws will slide along the conical surface 17 and force the jaws radially inwards. When the spider is moved rearwardly the side lips 28 on the jaws will ride on the shoulders 29 and move the jaws outwardly. The body of the spider is connected as by rivets or pins 39 to a chuck operating tube 40 extending rearwardly to a point beyond the end of the spindle. Normally, rearward movement of the spider is prevented by a helical spring 41 compressed between the spider and a bushing 42, the spring acting as the force holding the chuck jaws closed on the work. For heavy work it may be preferable to shift the spider positively in both directions, but the construction described permits rapidity both in making adjustment as to size and in opening and closing the chuck. A spring reaction sleeve 43, having an end flange 44 provided with spanner holes 45, is threaded tightly into the rear end of the spindle and holds the bushing 42 in place. The outer part of the rear end of the operating tube 40 is threaded at 46 and key slotted at 46', and has a chuck range nut 47 screwed upon it. A sleeve 48, with a flange 49 abutting the nut 47, carries a key 48' which slidably engages keyway 46' in operating the tube 40, and fits loosely over the threads 46. The sleeve 48 normally spaces the nut 4 from the flange 44, as shown in Fig. 1. The nut 47 is used to vary the range of diameters within which the chuck operates, the spring 41 allowing the operating tube to be moved forwardly or rearwardly within the spindle to change the position of the jaws relative to the encircling cone and therefore the diameter of rod which can be held within them. A keeper 50 is threaded onto the operating tube between flange 44 and bushing 42 to limit the overall movement permitted to the tube.

For opening and closing the chuck jaws to permit a work piece to be grasped or released additional mechanism is provided. A clutch operating crank 51 has one end 52 journaled in the housing 2, and its other end 53 likewise so journaled but extending beyond the housing so that an operating handle 54 may be attached to it by a clamp 55 (Fig. 3). Upon eccentric pins 56 on the crank is mounted a shoe 57 having a flat face 58 resting against the flange 49. As the crank is swung by its handle to bring the eccentric pins towards the flange the shoe will move the flange and hence the operating tube in a direction to open the chuck jaws. Closure of the jaws is accomplished by the action of the spring 41 when the handle is released.

The inner bearing surfaces 30 of the chuck jaws are relatively long, so that if the valve stem being grasped has worn places the jaws will bridge them and will hold the stem in the same manner that it is held in use by the valve guide. An additional refinement which may be used optionally is to grind the outer bearing surfaces 26 of the jaws longitudinally convex on a very long radius, so that their centers are perhaps 0.0002" higher than their ends, but preferably not in any event more than 0.001". This permits a very slight rocking of the jaws to accommodate slight variations in the valve stems due to uneven wear.

What we claim is:

1. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws having internal work grasping surfaces, each jaw being movable in one of said slots and having an outer surface in contact with said internal conical surface, a member reciprocable axially of the spindle through a constant distance and engaging the jaws to move them axially and thereby cause them to open and close, and means for moving said member axially independently of such reciprocation to change the range of opening of said jaws.

2. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws having internal work grasping surfaces, each jaw being movable in one of said slots, having an outer surface in contact with said internal conical surface, and having a notch on its inner surface, a member reciprocable axially of the spindle and having projections passing into said slots and notches whereby reciprocation of the member will cause the jaws to be shifted along said internal conical surface.

3. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws having internal work grasping surfaces, each jaw being movable in one of said slots and having an outer surface in contact with said internal conical surface, the inner surfaces of the jaws being formed collectively on a surface of revolution of larger radius than the capacity of the chuck, and means for shifting the jaws along said internal conical surface.

4. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws having internal work grasping surfaces, each jaw being movable in one of said slots and having an outer surface in contact with said internal conical surface, said outer surface being formed with a longitudinal curvature of such radius that the centers of said surfaces are less than a thousandth of an inch higher than the ends, and means for shifting the jaws along said internal conical surface.

5. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws having internal work grasping surfaces, each jaw being movable in one of said slots and having an outer surface in contact with said internal conical surface, said internal surfaces of the jaws being formed collectively on a surface of revolution of larger radius than the capacity of the chuck, said outer surfaces being formed with a longitudinal curvature of such radius that the centers of said surfaces are less than a thousandth of an inch higher than the ends, and means for shifting the jaws along said internal conical surface.

6. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws having internal work grasping surfaces, each jaw being movable in one of said slots and having an outer surface in contact with said internal conical surface, a member reciprocable axially of the spindle and engaging the jaws, spring means urging said member towards the small end of the cones, and manually operated means for shifting the member in the opposite direction.

7. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws having internal work grasping surfaces, each jaw being movable in one of said slots and having an outer surface in contact with said internal conical surface, a member reciprocable axially of the spindle and engaging the jaws, spring means urging said member towards the small end of the cones, a shouldered piece adjustably connected with said member, and manually operated means engaging said piece to shift the member in the opposite direction to that imparted to it by the spring.

8. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws having internal work grasping surfaces, each jaw being movable in one of said slots and having an outer surface in contact with said internal conical surface, said cone having an external flange, a ring threaded onto the body and having an internal flange, the mating surfaces of the flanges being at right angles to the axis of the cones and forming the sole contact between the cone and ring, whereby the cone will be free to mate with the exterior conical surface of the body, and means for shifting the jaws longitudinally in contact with the interior conical surface of the chuck cone.

9. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws having internal work grasping surfaces, each jaw being movable in one of said slots and having an outer surface in contact with said internal conical surface, and a member movable axially of the spindle and engaging the jaws to move them longitudinally of the spindle with their outer surfaces in contact with the inner conical surface of the chuck cone.

10. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws having internal work grasping surfaces, each jaw being movable in one of said slots and having an outer surface in contact with said internal conical surface, said jaws having their work grasping surfaces centrally recessed to receive a centering ring, whereby said surfaces may be ground collectively while in place in the chuck, and means for shifting the jaws along said internal conical surface.

11. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws, having internal work grasping surfaces, each jaw being movable in one of said slots and having an outer surface in contact with said internal conical surface, and having at their rear ends inwardly projecting fingers separated by notches from the work grasping surfaces, and a member reciprocable axially of the spindle and having outwardly extending projections engaging in said notches.

12. A chuck for valve stems and the like comprising a rotatable spindle, a centrally apertured, frusto-conical body fixed on the spindle and having a plurality of radial slots, a chuck cone having an internal conical surface mating with the exterior conical surface of the body and fixed upon said surface, a plurality of jaws, having internal work grasping surfaces, each jaw being movable in one of said slots and having an outer surface in contact with said internal conical surface, and having at their rear ends inwardly projecting fingers separated by notches from the work grasping surfaces, and a member reciprocable axially of the spindle, interfitting with said fingers, and having outwardly extending projections engaging in said notches, whereby the jaws are constrained for axial movement with said member but can move radially relatively to it.

JAMES Y. SCOTT.
FRANCIS P. HEALY.
EDWARD A. ALLEN.

REFERENCES CITED

The following references are of record in the file of this patent:

UNITED STATES PATENTS

| Number | Name | Date |
|---|---|---|
| 639,944 | Scott | Dec. 26, 1899 |
| 985,536 | Muehlmatt | Feb. 28, 1911 |
| 1,302,619 | Woglom | May 6, 1919 |
| 1,665,250 | Atkins | Apr. 10, 1928 |
| 1,711,769 | Bell et al | May 7, 1929 |
| 2,252,840 | Drissner | Aug. 19, 1941 |